United States Patent [19]

Neff

[11] Patent Number: 4,770,209

[45] Date of Patent: Sep. 13, 1988

[54] VALVE BASE WITH INTEGRAL FLOW CONTROLS

[75] Inventor: James A. Neff, Birmingham, Mich.

[73] Assignee: Mac Valves, Inc., Wixom, Mich.

[21] Appl. No.: 76,779

[22] Filed: Jul. 23, 1987

[51] Int. Cl.⁴ .................................................. F16K 11/00
[52] U.S. Cl. ........................................ 137/884; 251/266
[58] Field of Search ................. 137/269, 271, 884; 251/266, 267, 367

[56] References Cited

U.S. PATENT DOCUMENTS

| | | | |
|---|---|---|---|
| 949,115 | 2/1910 | Davey | 251/266 |
| 1,133,566 | 3/1915 | Lancaster | 251/266 X |
| 3,513,876 | 5/1970 | Tarbox | 137/596 |
| 3,550,621 | 12/1970 | Lansky | 137/884 |
| 3,563,268 | 9/1967 | Williams | 251/266 X |
| 4,377,183 | 3/1983 | Johansson et al. | 137/884 X |
| 4,509,556 | 4/1985 | Scanlon | 137/884 |
| 4,699,170 | 10/1987 | Diephius et al. | 251/266 X |

Primary Examiner—A. Michael Chambers
Assistant Examiner—John C. Fox
Attorney, Agent, or Firm—Robert G. Mentag

[57] ABSTRACT

A valve base for a fluid pressure valve system which is provided with integral exhaust flow control valve means which may be selectively mounted in an end of the valve base, or in a side of the valve base, or with an exhaust flow control valve means in an end of the valve base and another exhaust flow control valve means in a side of the valve base.

4 Claims, 2 Drawing Sheets

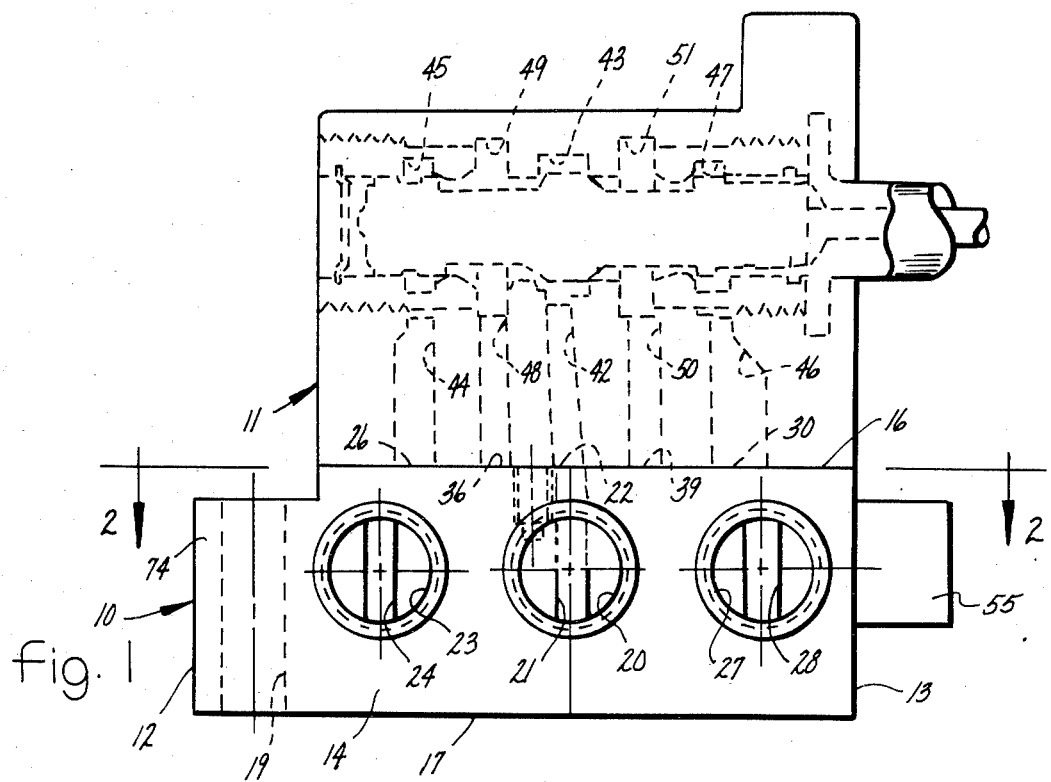
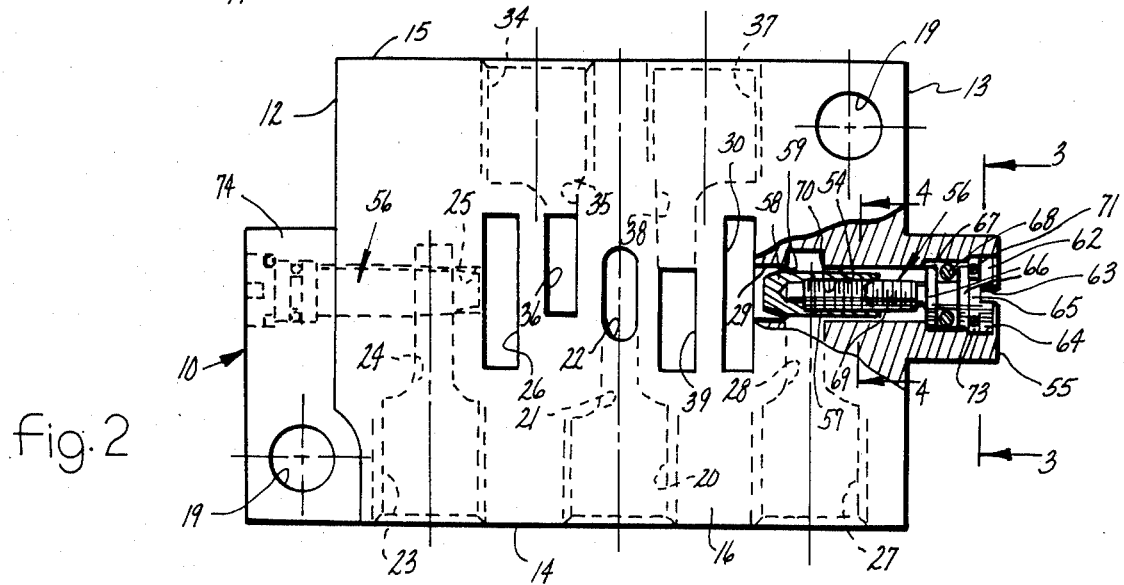
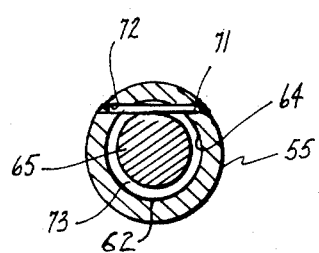
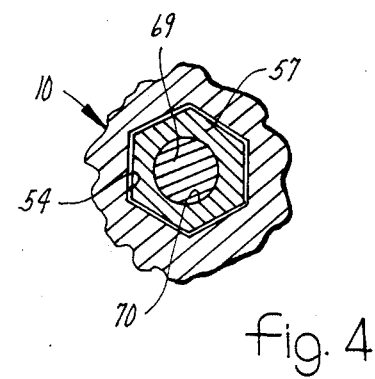

VALVE BASE WITH INTEGRAL FLOW CONTROLS

BACKGROUND OF THE INVENTION

1. Technical Field

The field of art to which this invention pertains may be generally located in the class of devices relating to valves. Class 137, Fluid Handling, United States Patent Office Classification, appears to be the applicable general area of art to which the subject matter similar to this invention has been classified in the past.

2. Background Information

Present day industrial plants employ a variety of machines which are provided with fluid pressure control systems that are operated by air pressure. The fluid pressure control systems for such machines vary from machine to machine. Some prior art fluid pressure control systems employ a directional control valve provided with exhaust flow control valves which are integrally mounted in the directional control valve body, or in a cover plate for said valve. Other prior art fluid pressure control systems which require exhaust flow control valves employ a sandwich or interface plate that is mounted on a directional control valve manifold or base, and the exhaust flow control valves are mounted in the sandwich or interface plate. A problem created by the additional use of sandwich or interface plates, for adding exhaust flow control valves to a directional control valve structure, or by adding additional integral exhaust flow control valves, is that such additions enlarge the overall directional control valve structure, increase the cost and weight of the valve structure, and make such a valve structure more complex. The enlargement of a directional control valve structure by the use of integral flow control valves, or by the use of sandwich or interface plates, is a disadvantage, because in many instances the directional control valve structure must be mounted in a very small space or area on a machine that it is controlling, as for example a robotic device. A further disadvantage of the use of sandwich or interface plates for adding exhaust flow control valves to a directional control valve structure is that such plates add additional weight to the overall valve structure, which is a disadvantage when the valve must be employed on a robot arm which is moved between many operative positions.

It is a primary object of the present invention, to provide a novel valve base which overcomes the problems of increased cost, increased weight and enlarged valve structures, when it is required to provide a flow control function with the use of a sandwich or interface plate in a pneumatic control system.

It is another objection of the present invention to provide a novel valve base which is light in weight, compact in structure, and which is adapted to selectively provide an exhaust flow control function.

It is a further object of the present invention to provide a novel valve base for a directional control valve structure which does not require a sandwich or interface plate in order to provide an exhaust flow control function.

It is still another object of the present invention, to provide a novel valve base for a directional control valve structure which provides a low profile valve structure, yet which can be employed to provide an exhaust flow control function.

SUMMARY OF THE INVENTION

The aforegoing objects are accomplished by providing a five port individual valve base with integral flow controls, which is simple and compact in structure, economical to manufacture and adapted for use in a fluid pressure valve system. The valve base of the present invention has a substantial rectangular configuration, with top, side, bottom, front side, rear side and end surfaces. The valve base is provided with an inlet pressure port and two exhaust ports formed on one side of the valve base. A pair of cylinder ports are formed in another side of the valve base. All of the ports are connected by passages to separate vertical passages which open on the top surface of the valve base for communication with corresponding passages in a fluid pressure valve mounted on the valve base. The passages connecting the exhaust ports to the exhaust openings on the top surface of the valve base are disposed outboard of the cylinder passages, and toward the ends of the valve base. The valve base may be selectively provided with a pair of flow control valve chambers extending inwardly, either from the end surfaces thereof, or from the side surfaces thereof, for operatively carrying a pair of flow control valves, for controlling the flow of exhaust fluid entering the exhaust openings on the top surface of the valve base and flowing through the exhaust passages in the valve base and out through the exhaust ports.

BRIEF DESCRIPTION OF THE DRAWINGS

FIG. 1 is a front elevation view of a five port individual valve base with integral exhaust flow control valve means, made in accordance with the principles of the present invention.

FIG. 2 is top plan view of the valve base illustrated in FIG. 1, taken along the line 2—2 thereof, and in the direction of the arrows.

FIG. 3 is a fragmentary, elevation section view of a portion of the valve base shown in FIG. 2, taken along the line 3—3 thereof, and looking in the directions of the arrows.

FIG. 4 is a fragmentary, elevation section view of the flow control valve means illustrated in FIG. 2, taken along the line 4—4 thereof, and looking in the direction of the arrows.

DESCRIPTION OF THE PREFERRED EMBODIMENTS

Figure 5:
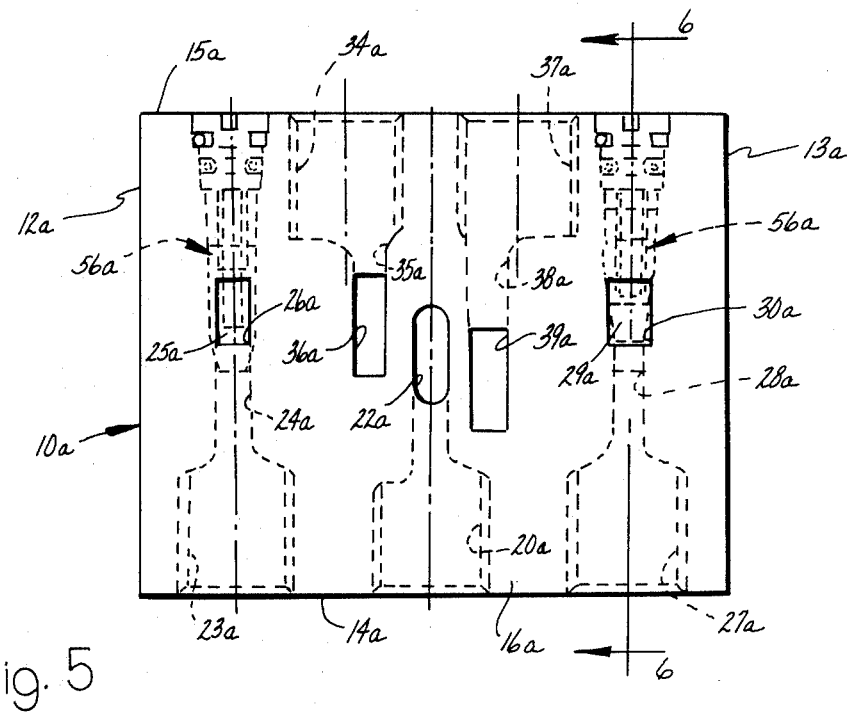
FIG. 5 is a top plan view of a second embodiment of the invention, and showing a five port individual valve base provided with a pair of integral exhaust flow control valves mounted through the rear side surface of the valve base, and showing one of the flow control valves in an open position, and the other flow control valve in a closed position.

Referring now to the drawings and in particular to FIG. 1, the numeral 10 generally designates a five port individual valve base made in accordance with the principles of the present invention and provided with integral exhaust flow control valve means. The numeral 11 generally designates a conventional solenoid operated valve which illustrates the use of the valve base 10. The directional control valve 11 does not form any part of the present invention, and the working parts thereof have been shown in broken lines merely to help understand the relationship and use of the directional control valve 11 with the base 10.

As shown in FIGS. 1 and 2, the valve base 10 is provided with left and right end surfaces 12 and 13, respectively, and front and rear side surfaces 14 and 15, respectively. As viewed in FIG. 2, the valve base 10 is provided with a top surface 16 and a bottom surface 17 (FIG. 1). The valve base 10 is provided with a pair of mounting holes 19 for the reception of mounting bolts for mounting the valve base 10 in a required operative position.

As best seen in FIG. 2, the valve base 10 is provided with an inlet pressure port 20 which is formed in the front side surface 14. The inlet pressure port 20 communicates through a horizontal transverse inlet pressure passage 21 with a vertical pressure passage 22 which terminates at the top surface 16 of the valve base 10. The valve base 10 is provided with a pair of exhaust ports 23 and 27 formed in the front side surface 14 thereof. As shown in FIG. 2, the exhaust port 23 communicates through a horizontal transverse exhaust passage 24 and a horizontal longitudinal exhaust bore or passage 25 with a vertical exhaust passage 26 which terminates at the top surface 16 of the valve base 10. The exhaust port 27 communicates through a horizontal transverse exhaust passage 28 and a horizontal longitudinal exhaust bore or passage 29 with a vertical exhaust passage 30 which terminates at the top surface 16 of the valve base 10.

A first cylinder port 34 and a second cylinder port 37 are formed in the rear side surface 15 of the valve base 10, and they comprise fluid device supply and return ports. The first cylinder port 34 communicates through a horizontal first transverse cylinder passage 35 with a vertical first cylinder passage 36 which terminates at the top surface 16 of the valve base 10. The second cylinder port 37 communicates through a horizontal second transverse cylinder passage 38 with a vertical second cylinder passage 39 which terminates at the top surface 16 of the valve base 10.

As illustrated in FIG. 1, the valve base inlet pressure passage 22 in the top surface 16 of the valve base 10 communicates through an inlet pressure passage 42 in the valve 11 with a inlet pressure chamber 43. The valve base exhaust passages 26 and 30 communicate through exhaust passages 44 and 46, respectively, with a pair of exhaust chambers 45 and 47, respectively, in the valve 11. The cylinder passages 36 and 39 in the top surface 16 of the valve base 10 communicate through cylinder passages 48 and 50, respectively, with cylinder chambers 49 and 51, respectively, in the valve 11.

As shown in FIG. 2, a flow control valve chamber 54 is formed in the valve base 10 and extends outwardly of the valve base 10 through a base extension 55. The flow control valve chamber 54 is aligned with the longitudinal, horizontal exhaust bore 29 which communicates with the vertical exhaust passage 30. A non-rising type flow control valve, generally indicated by the numeral 56, is operatively mounted in the flow control valve chamber 54. The flow of exhaust fluid from the exhaust bore 29 into the passage 28 and out through the exhaust port 27 is controlled by the flow control valve 56. The flow control valve 56 has a body which is cylindrically shaped along the central and front end thereof, as indicated by the numeral 57. Integrally formed on the inner end of the flow control valve body cylindrical portion 57 is a conically shaped valve 58, which is adapted to regulate the flow of exhaust fluid past a valve seat 59 that is formed at the junction point of the horizontal, longitudinal exhaust bore 29 and the exhaust passage 28. As shown in FIG. 2, the valve 58 is in a closed position relative to the valve seat 59, but when it is moved rearwardly, or to the right, as shown in FIG. 2, a flow of exhaust fluid is permitted past the valve seat 59 and into the passage 28 and out through the exhaust port 27.

The non-rising type flow control valve 56 has a cylindrical adjustment control head 62 that remains stationary, longitudinally, when it is rotated for adjusting the position of the valve 58. The cylindrical adjustment head 62 has a transverse slot 63 formed in the outer end face thereof, for rotating the adjustment head 62 by means of a suitable tool. The cylindrical adjustment head 62 is rotatably mounted in a bore 64 in the base extension 55, and it has integrally formed, on the inner end thereof, a reduced diameter shaft 65. The inner end of the shaft 65 is integrally attached to the outer end of a pair of longitudinally spaced apart, annular flanges 66, which are positioned in a bore 67, that communicates at its outer end with the bore 64, and which is of a slightly smaller diameter then the bore 64. A suitable O-ring seal 68 is mounted in the groove between the annular flanges 66 and it sealingly engages the surface of the bore 67. Integrally attached to the inner side of the inner most one of the flanges 66 is an elongated, threaded screw shaft 69. The screw shaft 69 is operatively mounted in a longitudinally extended threaded bore 70, which is formed in the rear end of the valve body 57, and which extends longitudinally inward from the rear end of the valve body 57.

As shown in FIG. 4, the outer end of the valve chamber 54 comprises a portion which is hexagonal in cross section. The rear end portion of the flow control valve body 57 is also provided with a circumferential, hexagonal shape so as to be slidably mounted in the hexagonal portion of the valve chamber 54. It will be seen, that when the flow control adjustment head 62 is rotated in one direction or the other, it will remain in its longitudinal position while turning the threaded shaft 69. The turning of the threaded shaft 69 in the threaded bore 70 causes the valve body 57 to move forward or backward, in a straight line action, without any rotation due to the sliding effect of the hexagonal rear end of the flow control valve body 57 in the hexagonal shaped portion of the flow control valve chamber 54.

As shown in FIGS. 2 and 3, any longitudinal movement of the flow control adjustment head 62 is prevented by a suitable retention means, such as the retention pin 71 which is mounted by a press fit through a bore 72 formed through the base extension 55 and through a peripheral groove 73 formed in the adjustment head 62. When the adjustment head 62 is rotated, the retention pin 71 slides in the groove 73 and prevents longitudinal movement of the control head 62 and the adjustment screw shaft 69. An enlarged view of the aforedescribed non-rising type flow control valve 56 is shown in FIGS. 5 and 7 of U.S. Pat. No. 4,574,844.

As shown in FIG. 2, a second flow control valve 56 is operatively mounted in a base extension portion 74 on the left side of the valve base 10. The last mentioned flow control valve 56 operates to provide a flow control function over the exhaust fluid exhausting into the base passage 26 and into the exhaust bore 25, and thence out through the exhaust passage 24 and the exhaust port 23.

In use, both of the flow control valves 56 may be employed or a single one of these flow control valves may be employed for controlling the flow of exhaust fluid through only one of the exhaust ports 23 or 27.

Figure 6:
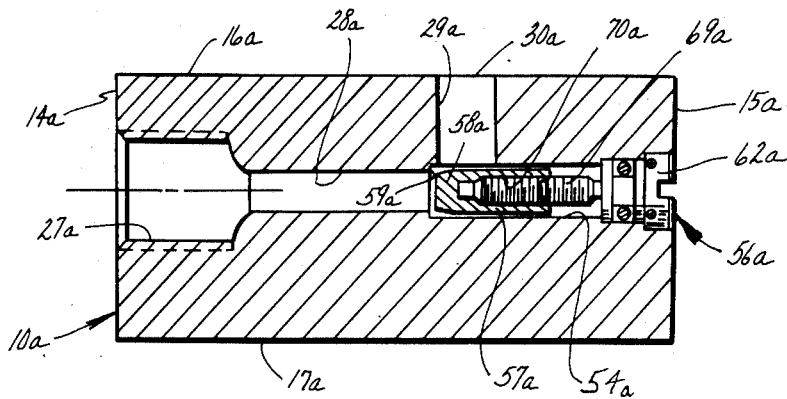
FIG. 6 is an elevation, section view of the valve base illustrated in FIG. 5, taken along the line 6—6, and looking in the direction of the arrows.

FIGS. 5 and 6 illustrate a second embodiment of the invention which comprises a five port individual valve base with a pair of integral flow control valves mounted therein from the rear side thereof, for controlling the flow of exhaust fluid out of the two exhaust ports 23a and 27a. The parts of the second embodiment of FIGS. 5 and 6 which are the same as the parts of the first embodiment of FIGS. 1 through 4 have been marked with the same reference numerals followed by the small letter "a".

It will be seen that the flow control valves 56a, as employed in the embodiment of FIGS. 5 and 6, are the same in structure and operation as the flow control valves 56 illustrated in FIGS. 2, 3 and 4. The only difference is that the flow control valves 56a are positioned to function in the flow control passages 24a and 28a, for regulating the flow of fluid past the valve seats 59a at the junction points with the exhaust bores 25a and 29a, respectively.

It will be understood that only one of the flow control valves 56 could also be used instead of two of said valves, in either of the valve base 10 end positions shown in FIG. 2, or in either of the valve base 10 side positions as shown in FIGS. 5 and 6. It will also be understood that one flow control valve 56 could be used on one end of the valve base 10 as shown in FIG. 2, and another flow control valve 56 could be simultaneously used on the side of the valve base 10 as shown in FIGS. 5 and 6. It will further understood that the positions of the ports 20, 23, 27, 34 and 37 could be interchanged, or be disposed in the bottom surface 17 of the valve base 10.

What is claimed is:

1. A valve base for a fluid pressure valve system, characterized by:
    (a) said valve base having a substantial rectangular configuration with top, bottom, front side, rear side, and end surfaces;
    (b) said valve base having an inlet pressure port formed in one of the valve surfaces, which communicates with an inlet pressure passage means in the valve base that terminates at the top surface of the valve base;
    (c) said valve base having a pair of cylinder ports formed in another of the valve surfaces, which communicate with separate cylinder supply and return passages in the valve base that terminate at the top surface of the valve base, on opposite sides of the inlet pressure passage means;
    (d) said valve base having a pair of exhaust ports formed in one of the valve surfaces, which communicate with separate horizontal exhaust passages in the valve base that communicate with separate vertical exhaust passages in the valve base that terminate at the top surface of the valve base, on the outer sides of the cylinder supply and return passages;
    (e) at least one of the separate horizontal exhaust passages has a flow control valve means operative therein for controlling the flow of fluid exhausting therethrough;
    (f) said at least one of the separate horizontal exhaust passages having a peripheral, circular valve seat formed therein;
    (g) said flow control valve means including a flow control valve chamber formed in the valve base and having an outer end open to the exterior of the base, and an inner end adjacent said circular valve seat;
    (h) said flow control means including a longitudinally movable control valve body mounted in said flow control valve chamber and having an inner end formed as a conically shaped valve for seating engagement with said circular valve seat;
    (i) a portion of the flow control valve chamber being formed hexagonal in cross section to slidably receive a peripheral hexagonal mating portion of the flow control valve body; and,
    (j) a rotatable screw shaft, fixed against longitudinal movement, mounted in the outer end of the flow control valve chamber and having an inner end rotatably engaged in a threaded inner bore formed in an outer end of the flow control valve body, and an outer end accessible from the exterior of the base, whereby the screw shaft can be rotated to move the flow control valve body longitudinally to move the conically shaped valve to a seating engagement with said circular valve seat or to a desired position away from the circular valve seat to allow a controlled flow of fluid exhausting through said at least one of the separate exhaust passages.

2. A valve base for a fluid pressure valve system, as defined in claim 1, characterized by:
    (a) each of said separate horizontal exhaust passages having a flow control valve means operative therein for controlling the flow of fluid exhausting therethrough.

3. A valve base for a fluid pressure valve system, as defined in claim 2, characterized by:
    (a) each of said flow control valve means being mounted in opposite ends of the valve base.

4. A valve base for a fluid pressure valve system, as defined in claim 2, characterized by:
    (a) each of said flow control valve means being mounted in one of the sides of the valve base.

* * * * *